United States Patent Office 2,846,474
Patented Aug. 5, 1958

2,846,474

PREPARATION OF CYCLOALKANONES

Frederick F. Blicke, Ann Arbor, Mich., assignor to Regents of the University of Michigan, Ann Arbor, Mich., a corporation of Michigan No Drawing. Application April 21, 1952
Serial No. 283,526

5 Claims. (Cl. 260—586)

The present invention relates to the preparation of cyclic ketones and is more particularly concerned with a process for the production of cycloalkanones possessing one more ring member than is present in the starting compound, which process involves the electrolytic reduction of certain intermediate 1 - (nitroalkyl) - cycloalkanols.

Heretofore, cyclic alkanones, notably, cycloheptanone (suberone) have been prepared by reacting a cyclic alkanone of the homologous series, containing one less ring member (methylene group) than the desired cycloalkanone, with a nitroalkane in the presence of a minor amount of anhydrous sodium ethylate or other condensation catalyst, such as piperidine or dimethylamine, to form the intermediate nitroalkyl-cycloalkanol, which latter compound was in turn reduced in less than ten percent yield by conventional chemical procedure to the corresponding aminoalkyl-cycloalkanol. The desired cycloalkanone was then obtained by reaction of the aminoalkyl-cycloalkanol with nitrous acid whereby the cycloalkanol ring opened and subsequently contained an added methylene member upon closure of the ring. Under such conditions, yields of an optimum of five percent of the desired cycloalkanone, based upon the intermediate nitroalkyl-cycloalkanol, have been reported in the literature. More recently, cyclic ketones have been prepared in somewhat greater yields from the cycloalkanones of a lower homologous series by a procedure wherein the reduction of the nitroalkyl-cycloalkanol to the corresponding aminocycloalkanol has been achieved by chemical reduction in the presence of a Raney nickel catalyst.

Therefore, it is an object of the present invention to provide a method for the preparation in good yield of higher membered cyclic ketones from a cyclic ketone of the next lower homologous series.

Another object of the present invention is to provide a method wherein a cycloalkanone of the formula

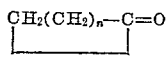

in which $n$ is an integer selected from the group consisting of 4, 5 and 6, can be condensed with a nitroalkane in the presence of a novel condensing agent to form a 1-(nitroalkyl)-cycloalkanol, which in turn can be electrolytically reduced in exceptionally high yield to form a 1-(aminoalkyl)-cycloalkanol from which the desired cycloalkanone of the formula

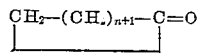

can be obtained upon reaction with nitrous acid.

Still a further object of the present invention is the provision of a novel electrolytic procedure for reduction of nitroalkyl-cycloalkanols.

An additional object of the present invention is to prepare 1-(nitroalkyl)-cycloalkanols in high yield by the reaction of cyclic alkanones with certain nitroalkanes in the presence of a comparatively large quantity of an aqueous alkali metal base condensation reagent.

It is yet another object of the present invention to prepare 1-(aminoalkyl)-cycloalkanols in high yield by a procedure wherein cycloalkanones are nitroalkylated with nitroalkanes in the presence of a novel condensation reagent and the resulting nitro-alcohol electrolytically reduced to form a corresponding amino-alcohol.

An additional object of the present invention is to provide certain novel 1-(nitroalkyl)-cycloalkanols and 1-(aminoalkyl)-cycloalkanols.

Other objects of the present invention will become apparent to those skilled in the art to which this invention pertains.

The novel method of the present invention is directed to the preparation of cycloalkanones and comprises reacting a cycloalkanone having the formula

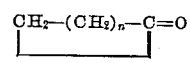

wherein $n$ is an integer selected from the group consisting of 4, 5 and 6, with a nitroalkane to form a 1-(alpha-nitroalkyl)-cycloalkanol, electrolytically reducing the 1-(alpha-nitroalkyl)-cycloalkanol to form a 1-(alpha-aminoalkyl)-cycloalkanol, and converting the thus-formed 1-(alpha-aminoalkyl)-cycloalkanol to a cycloalkanone having the formula

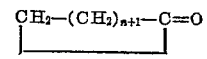

wherein $n$ is the integer of the cycloalkanone employed in the first step of the method. A novel step in applicant's invention includes the reaction of a cycloalkanone with a nitroalkane in the presence of an aqueous alkali metal hydroxide condensation reagent to form a 1-(alpha-nitroalkyl)-cycloalkanol. An additional novel step of the present invention includes the electrolytic reduction of a 1-(alpha-nitroalkyl)-cycloalkanol having the formula

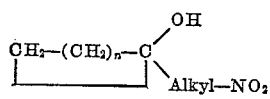

wherein $n$ is an integer selected from the group consisting of 4, 5 and 6 to form the corresponding 1-(alpha-aminoalkyl)-cycloalkanol.

Among the novel compounds of the present invention is the 1-(nitromethyl)-cycloheptanol.

The process of the present invention has utility in the preparation of higher membered cyclic ketones. By such process, a cycloalkanone possessing one more methylene group in the ring than in the starting cycloalkanone is produced. Thus, the process of the present invention can be utilized to form successively higher membered cyclic ketones, each cyclic ketone having at least one more methylene group than the one from which it was prepared. Likewise, the novel nitro-alcohol and amino-alcohol compounds are of utility in the ring enlargement procedure wherein higher alkanones are desired end products.

The ketones employed as the starting compounds in the novel process of the present invention are cyclic ketones and preferably those cycloalkanones of the formula

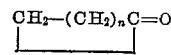

wherein $n$ is an integer selected from the group consisting of 4, 5 and 6. The process is operative with cycloalkanones wherein n is less than 4, but other adequate chemical procedures are available for preparing such cycloalkanones as cyclopentanone, cyclohexanone and the like. Substituted cycloalkanones, such as 3-methylcyclohexanone, 4-methylcyclohexanone, and other alkyl-substituted cycloalkanones are operative in the present invention and will not be affected by either the electrolytic reduction or subsequent nitrous acid reaction wherein the ring is split open and enlarged to include an additional methylene member. Unsaturated cyclic ketones may sometimes be employed, although the double bonds may be hydrogenated in the electrolytic reduction phase of the process and the resulting end product may be a saturated cycloalkanone.

The nitroalkylating reagents are the nitroalkanes, preferably the lower-nitroalkanes, such as nitromethane, nitroethane, 2-nitropropane, nitro-n-propane, nitro-n-butane, nitro-n-hexane and like compounds, which can be condensed with the starting cycloalkanones to form alpha-nitroalkylated cycloalkanols. Nitromethane is the nitroalkane of ultimate choice.

The novel condensation reagent of the present invention is an alkali metal hydroxide, notably sodium and potassium hydroxide, employed as an aqueous solution, generally in admixture with methanol or other appropriate organic solvent. The condensation is thus preferably conducted under non-anhydrous conditions. Heretofore, sodium ethylate ($NaOC_2H_5$) or mixtures of ethanol and sodium under strictly anhydrous conditions have customarily been employed to enhance the condensation of the starting cyclic ketones with the nitroalkylating reagent. In addition, much greater quantities of the condensing reagent are employed in the process of the present invention than in the prior art procedures, from 0.75 to 1.5 and above moles of sodium hydroxide per mole each of starting cycloalkanone and nitroalkane being preferably utilized. For example, nitroalkanols in yields of up to 72 percent are consistently achieved with approximately equimolar quantities of sodium hydroxide.

In carrying out the novel condensation step of the present invention, the starting cycloalkanone and nitroalkane are dissolved in methanol or other appropriate organic solvent and the resulting solution is cooled to below about fifteen degrees centigrade, preferably to about five degrees centigrade. Employment of temperatures substantially in excess of fifteen degrees centigrade may result in lowered yields and in the formation of undesired polymeric materials. The aqueous alkali metal hydroxide solution is then introduced into the admixture, the colorless sodium salt of 1-(alpha-nitroalkyl)-cycloalkanol then precipitating. The sodium derivative is then hydrolyzed, preferably with glacial acetic acid, although other saturated fatty acids and other organic acids may be employed. Dilute mineral acids, e. g., hydrochloric are generally not suitable since their use may lead to the formation of cycloalkenes or straight-chain nitroalkanes and nitroalkenes instead of the desired nitroalkyl-cycloalkanols. After hydrolysis is accomplished, the acetic or other acid employed as the hydrolyzing agent is neutralized with dilute alkali, for example, sodium bicarbonate solution. The desired nitroalkyl-cycloalkanol is then obtained by fractional distillation or other isolation procedure from an ether or other solvent solution, such as benzene, petroleum ether, chloroform, and the like.

The resulting nitro alcohol, a 1-(alpha-nitroalkyl)-cycloalkanol, is next electrolytically reduced, the assembly and type of reduction apparatus being variable within a wide range. For example, one cell or several cells in series may be satisfactorily employed. Lead electrodes as both the anode and cathode are preferably used, although copper and lead or copper and cadmium electrodes and other combinations can be substituted therefor. A satisfactory, illustrative reduction system can be set up by employing lead plate anodes and cathodes in a series of three electrolytic cells, the cathode chamber of each cell including the lead plate cathode and a cylindrical porous cup eight centimeters in diameter and twelve and one-half centimeters in height. The cathode chamber is positioned between two lead plates serving as the anode contained in a two-liter beaker. The 1-(alpha-nitroalkyl)-cycloalkanol to be reduced is placed in the cathode chamber in admixture with a catholyte composed of dilute acids or mixtures thereof. Sulfuric acid is the preferred catholyte although hydrochloric or a mixture of hydrochloric and acetic acids and the like are suitable. Denatured alcohol or other solvent can be added to the catholyte mixture, if desired. The catholyte acid or acid mixtures are preferably dilute, concentrations of about ten percent being preferred, since direct contact of the nitro-alcohol and concentrated acid may result in dehydration followed by subsequent polymerization of the resulting nitro-alkene to yield undesirable polyalkene materials. The anolyte in the anode chamber is likewise an acid or mixtures of various acids, dilute sulfuric acid being preferred. Reduction of the nitro-alcohol in the cathode chamber is effected with a current of from seven to nine amperes and a current density of 0.062 to 0.067 ampere per square centimeter in the electrolytic system described here for purposes of illustration, wherein lead electrodes are used. Current densities of above 0.067 ampere per square centimeter are operative but tend to produce higher boiling materials rather than the desired 1-(aminoalkyl)-cycloalkanones. The current densities in other electrolytic systems will depend upon the type of electrodes employed and other factors. The temperature of the reaction mixture is maintained preferably between zero and fifty degrees centigrade, the yield of reduction product being diminished somewhat if temperatures higher than fifty degrees centigrade are maintained. In the illustrated electrolytic system, temperatures of 25 to 30 degrees centigrade are very satisfactory. The nitro-alcohol is generally added to the catholyte in several additions, thereby enhancing the ultimate yield and substantially precluding the dehydration of the nitro-alcohol to a nitroalkene by acid action of the catholyte. The pH of the reduction mixture is less than one initially but as the nitro substituents are gradually reduced to amino groups, the pH rises to from between about three and six or seven. The reaction is conducted for a period of time in excess of that theoretically required, based upon the current employed. Thus, from between six and twelve hours or more are generally required to complete the electrolytic reduction. In the electrolytic system described in Example 1, the theoretical time required was approximately six and one-half hours, whereas a total elapsed time of eleven hours was actually utilized. The reaction is preferably conducted with the aid of efficient, mechanical stirring of the 1-(alpha-nitroalkyl)-cycloalkanol in the cathode compartment, thereby facilitating the reduction.

By proper regulation with the appropriate acid of the pH of the catholyte containing the completely reduced nitro-alcohol, the 1-(alpha-aminoalkyl)-cycloalkanol can be isolated as the hydrogen sulfate, phosphate, hydrochloride, tartrate, neutral sulfate, or other acid addition salt. If desired, the free 1-(alpha-aminoalkyl)-cycloalkanol can be obtained by rendering the catholyte contents alkaline. Yields of the electrolytic reduction product, the desired 1-(alpha-aminoalkyl)-cycloalkanol or acid addition salts thereof, of from between 77 and 90 percent are consistently achieved, based on the input of the corresponding nitro-alcohol, by the novel electrolytic process of the present invention.

In the preparation of a cycloalkanone having one more methylene group than the starting cycloalkanone, the reduction mixture from the cathode chamber of the electrolytic cell can be subjected directly to the action of nitrous acid, thereby eliminating the isolation of the intermediate amino-alcohol or of the acid addition salts.

thereof. The catholyte mixture is adjusted to an acidic pH, for example, between about three and five, a pH of about four being preferred. The acidified mixture is then cooled to less than ten degrees centigrade and sodium nitrite (NaNO₂) in aqueous solution added dropwise or in small portions over a period of from one to several hours. The resulting admixture, the pH of which is maintained at between about five and six, is then heated at reflux or other elevated temperatures for a period of one or more hours, and extracted with ether or other appropriate organic solvent. The desired cycloalkanone or substituted cycloalkanone is then obtained from the extractions by conventional isolation procedure.

The following examples illustrate the practice of the present invention but are not to be construed as limiting the same.

*Example 1.—Cycloheptanone (suberone)*

A. *1 - (nitromethyl) - cyclohexanol.*—98.1 grams (1.0 mole) of cyclohexanone, 61.0 grams (1.0 mole) of nitromethane and 600 milliliters of methanol were admixed, stirred and cooled to five degrees centigrade by means of an ice bath. To the resulting admixture was added a solution of fifty grams (1.25 moles) of sodium hydroxide in 75 milliliters of water in small portions over a period of about one-half hour, the temperature of the reaction mixture being maintained below ten degrees centigrade by means of the ice-bath. Precipitation of the colorless sodium derivative of 1-(nitromethyl)-cyclohexanol was observed after the alkali addition was about one-third complete. The resulting thick, alkaline suspension was stirred for an additional one-half hour, the reaction mixture being continually cooled by the ice-bath. The condensed product, the sodium salt of 1-(nitromethyl)-cyclohexanol, was then filtered, suspended in 500 milliliters of water and thoroughly agitated. Eighty milliliters of glacial acetic acid was added, the resulting mixture extracted with three successive 200-milliliter portions of ether, and the combined ether extractions washed with sodium bicarbonate solution and then with water until the aqueous washings became neutral to litmus paper. The ether solution was dried over anhydrous magnesium sulfate and the ether removed on a steam bath. Fractional distillation, under reduced pressure, of the residue remaining upon evaporation of the ether, yielded 106.0 grams (67 percent of the theoretical yield) of 1-(nitromethyl)-cyclohexanol, boiling at 129–133 degrees centigrade at nineteen milimeters' pressure having a density at twenty degrees centigrade of 1.1589 and a refractive index at twenty degrees centrigrade of 1.4875.

B. *1-(aminomethyl)-cyclohexanol.*—The apparatus utilized in the electrolytic reduction procedure comprised three cells, connected in series, the cathode chamber of each cell consisting of a lead-plate cathode inserted in a cylindrical porous cup eight centimeters in diameter and twelve and one-half centimeters in height. The cathode chamber of each cell was placed between the two lead plates of the anode, the anode being immersed in about 700 milliliters of ten per cent sulfuric acid solution contained in a two-liter beaker. To each porous cup (cathode) was added 400 milliliters of ten percent sulfuric acid after which 26.5 grams (one-sixth mole) of 1-(nitromethyl)-cyclohexanol was introduced and kept in suspension in the acid by efficient mechanical stirring. The reduction of the 1-(nitromethyl)-cyclohexanol was achieved with a current of eight amperes and a current density of 0.067 ampere per square centimeter, the temperature of each cell being maintained at approximately thirty degrees centigrade by continuous circulation of cool water around each two-liter beaker. After four hours, an additional 26.5 grams of the nitro-alcohol was added to each of the three cylindrical porous cups (cathodes), making a total of 53 grams addition to each cup and an overall addition of 159.0 grams (1.0 mole) of 1-(nitromethyl)-cyclohexanol to the electrolytic reduction system. After five additional hours (total time of nine hours), the electrolytic reduction system was disconnected, the combined cathode fractions containing the desired 1-(aminomethyl)-cyclohexanol.

C. *Cycloheptanone (suberone).*—The resulting reaction mixture obtained from the electrolytic reduction was adjusted to a pH of four, stirred and cooled to between zero and five degrees centigrade. To this reaction mixture maintained at a temperature of zero to five degrees centigrade was added dropwise 83.0 grams (1.2 moles) of sodium nitrite dissolved in 300 milliliters of water, a pale yellow oil separating at the surface of the solution shortly after the nitrite addition was commenced. After the addition of the sodium nitrite was completed, the mixture was stirred and allowed to warm to room temperature during a two-hour period, the pH being maintained at between five and six. The mixture was heated in a flask equipped with a reflux condenser on a steam bath for one hour. Upon cooling, the oily layer was separated, the aqueous layer extracted with ether, and the oil and ether extractions combined. The resulting ethereal solution was washed with aqueous sodium bicarbonate and then with water until the aqueous washings became neutral. The ether solution was dried over anhydrous magnesium sulfate, the ether removed by steam-bath distillation and the remaining residue fractionally distilled, producing 64 grams (57 percent yield based on the starting 1-(nitromethyl)-cyclohexanol) of cycloheptanone having a boiling point of 66–70 degrees centigrade at sixteen millimeters of mercury pressure. The product exhibited a density at twenty degrees centigrade at 0.9490 and a refractive index at twenty degrees centigrade of 1.4608.

*Example 2.—Acid addition salts of 1-(aminomethyl)-cyclohexanol*

A. *1-(aminomethyl)-cyclohexanol sulfate.*—Following the procedure of Example 1A, 1.0 mole of cyclohexanone was condensed with 1.0 mole of nitromethane in the presence of 1.25 moles of sodium hydroxide, and the resulting nitro-alcohol (1-(nitromethyl) - cyclohexanol) electrolytically reduced, employing the apparatus and procedure of Example 1B, yielding a combined reaction mixture containing the desired amino-alcohol (1-(aminomethyl)-cyclohexanol). The pH of the reaction mixture was adjusted to between four and five and the thus-acidified mixture filtered, and the filtrate evaporated to dryness. Repeated recrystallization of the solid residue from an ethanol-water mixture produced 148 grams (83 percent yield) of the neutral sulfate of 1-(aminomethyl)-cyclohexanol having a melting point of 266–267 degrees centigrade.

*Analysis.*—Calculated for $2C_7H_{15}ON \cdot H_2SO_4$: N, 7.87; S, 9.00. Found: N, 7.86; S, 9.13.

The 1-(aminomethyl)-cyclohexanol sulfate was then dissolved in 400 milliliters of water, the pH adjusted to a value of four and the conversion to the end product, cycloheptanone achieved by means of the sodium nitrite procedure, according to the method of Example 1C.

B. *1-(aminomethyl)-cyclohexanol acid sulfate.*—The reaction mixture obtained from the condensation of one mole of cyclohexanone with one mole of nitromethane in the presence of 1.25 moles of sodium hydroxide in methanol, followed by electrolytic reduction of the 1-(nitromethyl)-cyclohexanol to 1-(aminomethyl)-cyclohexanol was treated with sulfuric acid until a pH of between one and two was obtained. The thus-acidified reaction mixture was filtered, the filtrate evaporated to dryness and the solid residue fractionally recrystallized from an ethanol ether mixture thus yielding 175 grams (77 percent yield) of the acid sulfate of 1-(aminomethyl)-cyclohexanol, exhibiting a melting point of 132–133 degrees centigrade.

*Analysis.*—Calculated for $C_7H_{15}ON \cdot H_2SO_4$: N, 6.17; S, 14.11. Found: N, 6.12; S, 14.28.

C. 1-(aminomethyl)-cyclohexanol hydrochloride.—
The pH of an amino alcohol reaction mixture, obtained according to the procedure of Examples 1A and 1B, was adjusted to four, the resulting solution filtered and the filtrate evaporated to near dryness. The thus-concentrated mixture was made alkaline by the addition of solid sodium hydroxide, the alkaline admixture extracted with ether, the combined ether extractions dried over anhydrous magnesium sulfate, and an excess of dry hydrogen chloride then bubbled through the ether solution. The 1-(aminomethyl)-cyclohexanol precipitated as its hydrochloride salt. Repeated recrystallization from absolute ethanol gave 126 grams (76 percent yield based upon the starting 1-(nitromethyl)-cyclohexanol) of the 1-(aminomethyl)-cyclohexanol hydrochloride melting at 213–214 degrees centigrade.

Reaction of the sulfate, acid sulfate and hydrochloride of 1-(aminomethyl)-cyclohexanol, respectively, with nitrous acid formed in situ according to the procedure of Example 1C, was productive of cycloheptanone, boiling at 66–70 degrees centigrade at sixteen millimeters of pressure, in yields up to seventy percent based on the starting 1-(aminomethyl)-cyclohexanol.

*Example 3.—1-(nitromethyl)-cyclohexanol*

Three hundred ninety-two and four-tenths grams (392.4) (4.0 moles) of cyclohexanone ($C_6H_{10}O$), 244.0 grams (4.0 moles) of nitromethane and 2400 milliliters of methanol were admixed, stirred and cooled to five degrees centigrade by means of an ice-bath. While maintaining the resulting admixture at a temperature of below ten degrees centigrade, 200 grams (5.0 moles) of sodium hydroxide in 300 milliliters of water was added dropwise over a period of one-half hour, the precipitation of the colorless sodium salt of 1-(nitromethyl)-cyclohexanol beginning after about one-third of the aqueous sodium hydroxide had been added. The resulting, thick, alkaline suspension was stirred an additional one-half hour, the reaction mixture being continually cooled by means of the ice-bath. The condensation product, the sodium salt of 1-(nitromethyl)-cyclohexanol, was then filtered, suspended in 2000 milliliters of water, thoroughly agitated and 320 milliliters of glacial acetic acid added to hydrolyze the nitro-alcohol salt. The resulting acidified reaction mixture was extracted with three successive 800-milliliter portions of ether, the combined ether extracts washed with dilute sodium bicarbonate solution and then with water until the aqueous washings were neutral to litmus paper. The combined ether extracts were dried over anhydrous magnesium sulfate and the ether removed by means of a steam-bath. Fractional distillation of the residue under reduced pressure yielded 457.9 grams (72 percent of the theoretical yield) of the 1-(nitromethyl)-cyclohexanol, boiling at 129–133 degrees centigrade and having a density at twenty degrees centigrade of 1.1589 and a refractive index at twenty degrees centigrade of 1.4875.

*Example 4.—Electrolytic reduction of 1-(nitromethyl)-cyclo-hexanol*

The apparatus employed included three cells, each contained in a two-liter beaker, and connected in series. The cathode chamber of each cell included a lead plate cathode (about 120 square centimeters total surface area), placed in a cylindrical porous cup about eight centimeters in diameter and 12.5 centimeters in height. The catholyte solution used in the cathode chamber was a mixture of 125 milliliters of concentrated hydrochloric acid and 250 milliliters of alcohol. The cathode chamber was placed in each cell (two-liter beaker) between the lead plates of the anode, the anode plates being immersed in about one liter of twenty percent sulfuric acid contained in each two-liter beaker. Each beaker (cell system) was placed in an ice-bath in order to maintain the temperature of the reaction mixture at between 25 and 50 degrees centigrade, and was provided with stirring means in the cathode chamber so that the nitro-alcohol being reduced could be continually agitated. Fifty-three (53.0) grams (0.33 mole) of the 1-nitromethyl)-cyclohexanol was introduced into the hydrochloric acid-alcohol mixture contained in each cylindrical porous cup, which, together with the lead plate cathode formed the cathode chamber of each cell, and the reduction carried out using a current of between 7.6 and 8.0 amperes, the current density thus being about 0.063 to 0.067 amperes per square centimeter. At the end of three and one-half hours an additional 0.33 mole (53.0 grams) of the nitro-alcohol was added to each cathode chamber, the total addition to each cell being 1.0 mole with the overall addition to the electrolytic system being 3.0 moles, and the reaction continued an additional four hours (total elapsed time of eleven hours). The current was then turned off, the electrodes disconnected and the reaction mixture removed from the cathode chamber. The solvent was distilled off under reduced pressure, leaving the hydrochloride salt of 1-(aminomethyl)-cyclohexanol as the residue in the distillation flask. The residue was taken up in water and made alkaline with the addition of solid sodium hydroxide. The resulting alkaline mixture was extracted with ether and the ether extracts combined and dried over anhydrous magnesium sulfate. 352 grams (91 percent conversion from the nitro-alcohol) of the free 1-(aminomethyl)-cyclohexanol was obtained by removal of the solvent on a steam bath.

*Example 5.—1-(aminomethyl)-cyclohexanol sulfate from cyclohexanone*

Three hundred ninety-two (392) grams (4.0 moles) of cyclohexanone, 244 grams (4.0 moles) of nitromethane and 2400 milliliters of methanol were admixed, stirred and cooled to between zero and five degrees centigrade by means of an ice-bath. To the resulting mixture was added dropwise 200 grams (5.0 moles) of sodium hydroxide in 300 milliliters of water over a period of about one-half hour, during which time the temperature of the reaction mixture was maintained below about ten degrees centigrade. The thick, alkaline slurry was stirred an additional one-half hour, the reaction mixture being continually cooled by the ice-bath, the resulting condensation product, the sodium salt of 1-(nitromethyl)-cyclohexanol, filtered, and the filter cake suspended in 200 milliliters of water. After thoroughly agitating the suspended sodium salt of 1-(nitromethyl)-cyclohexanol, 320 milliliters of glacial acetic acid was added and the resulting mixture extracted with three successive 800-milliliter portions of ether, the ether extracts combined, washed with dilute sodium bicarbonate solution and then with water until the aqueous washings became neutral. The ether extracts were dried over magnesium sulfate and the solvent removed on a steam-bath. The remaining residue, containing the 1-(nitromethyl)-cyclohexanol reaction product, was divided into six equal parts.

The electrolytic reduction apparatus included three cells connected in series, the cathode chamber of each cell consisting of a lead plate cathode contained in a cylindrical porous cup about eight centimeters in diameter and 20.0 centimeters in height. The cathode chamber was placed in each cell (a four-liter beaker) between the two lead plates of the anode, the anode being immersed in about 1050 milliliters of ten percent sulfuric acid solution contained in each four-liter beaker. To each cathode chamber was added 600 milliliters of ten percent sulfuric acid as the catholyte, after which one of the six fractions of the nitro-alcohol reaction product, obtained from the condensation of cyclohexanone with nitromethane in the presence of aqueous sodium hydroxide, was added to each cell. The 1-(nitromethyl)-cyclohexanol was kept in suspension in the catholyte by employing continual mechanical stirring. The reduction reaction was conducted with a current of about 12.0 amperes, the current density being about 0.065 ampere per square centimeter, and the temperature of each cell maintained at between 25 to 35 degrees centigrade by continual circulation of cool water around the four-liter beakers. After about four hours, the second one-sixth fraction was added to each cathode chamber completing the addition of 1-(nitromethyl)-cyclohexanol and the reduction continued an additional five hours. After discontinuing the current and disconnecting the electrodes, the solution containing the reduction product was removed from the cathode chamber and adjusted to a pH of approximately four. The reaction mixture was then filtered, the filtrate evaporated to dryness and the neutral sulfate of 1-(aminomethyl)-cyclohexanol obtained in substantially pure form upon repeated recrystallization from a mixture of ethanol and water. Four hundred thirty (430) grams of 1-(aminomethyl)-cyclohexanol sulfate product (a sixty percent yield of the theoretical based upon the starting quantity of cyclohexanone employed), was obtained and exhibited a melting point of 266–267 degrees centigrade.

*Analysis.*—Calculated for $2C_7H_{15}ON \cdot H_2SO_4$: N, 7.87; S, 9.00. Found: N, 7.86; S, 9.13.

Example 6.—1-(alpha-nitroalkyl)-cyclohexanols

Following the procedure of Example 3, one mole of cyclohexanone was condensed with one mole of nitroethane in a methanol solution in the presence of an aqueous potassium hydroxide condensation reagent and the resulting reaction product isolated in the manner of Example 3. 1-(alpha-nitroethyl)-cyclohexanol, boiling at 138–140 degrees centigrade under seventeen millimeters of mercury pressure was obtained.

In like manner, 2.0 moles of cyclohexanone was condensed with 2.0 moles of nitro-n-propane in the presence of 2.5 moles of aqueous potassium hydroxide, following the procedure of Example 3. Practical distillation yielded the free 1-(alpha-nitro-n-propyl)-cyclohexanol having a boiling point of 139–141 degrees centigrade under nine millimeters of mercury pressure.

Following the electrolytic reduction procedure, illustrated in Example 4, these 1-(alpha-nitroalkyl)-cyclohexanols can be reduced to form the corresponding amino-alcohols.

Example 7.—Cyclooctanone

Fifty-six (56) grams (0.5 mole) of cycloheptanone (suberone) obtained according to the procedure of Example 1 was admixed with 30.5 grams (0.5 mole) of nitromethane and 350 milliliters of methanol and the resulting admixture stirred and cooled to about ten degrees centigrade by means of an ice-bath. To the resulting admixture was added dropwise twenty grams (0.5 mole) of sodium hydroxide in thirty milliliters of water over a period of about twenty minutes, the temperature of the resulting mixture being maintained between five and fifteen degrees centigrade by means of an ice-bath. The resulting alkaline suspension was stirred an additional one-half hour, the reaction mixture being continually cooled by the ice-bath and the condensed product, the sodium salt of 1-(nitromethyl)-cycloheptanol, diluted with 200 milliliters of water and the thus-formed suspension thoroughly agitated. Thirty-five milliliters of glacial acetic acid was added and the acidic mixture extracted with two successive 100-milliliter portions of ether. The combined ether extractions were washed with dilute sodium bicarbonate solution and then with water until the aqueous washings were neutral when tested by litmus paper. The ether extractions were dried over anhydrous magnesium sulfate and the ether removed on a steam bath. Fractional distillation under reduced pressure of the residue remaining upon evaporation of the ether yielded 1-(nitromethyl)-cycloheptanol, boiling at 121–124 degrees centigrade under nine milliliters of mercury pressure.

In the manner of Example 1B, the 1-(aminomethyl)-cycloheptanol, boiling at 124 degrees centigrade under fifteen millimeters of mercury pressure, is formed in good yield by employing the electrolytic reduction procedure.

Following the process of Example 1C, the thus-formed 1-(aminomethyl)-cycloheptanol is converted to cyclooctanone, boiling at 80–83 degrees centigrade under a pressure of fifteen millimeters.

Example 8.—Substituted 1-(nitroalkyl)-cyclohexanols

Following the procedure of Example 5, one mole of 4-methylcyclohexanone was condensed with one mole of nitromethane in methanol in the presence of one mole of sodium hydroxide and the resulting sodium salt of 1-(nitromethyl)-4-methylcyclohexanol neutralized. Fractional distillation of the residue from the neutralized nitro-alcohol solution yielded 1-(nitromethyl)-4-methylcyclohexanol, boiling at 149–152 degrees centigrade under 24 millimeters of mercury pressure, in a yield of 68 percent based upon the starting 4-methylcyclohexanone reagent.

Employing the apparatus described in Example 5, the substituted nitro-alcohol was electrolytically reduced to form a good yield of 1-(aminomethyl)-4-methylcyclohexanol, boiling at 121–124 degrees centigrade under 24 millimeters of mercury pressure. The hydrochloride acid addition salt exhibited a melting point of 198–199 degrees centigrade.

In like manner, 1-(nitromethyl)-cyclohexene, boiling at 112–116 degrees centigrade under seventeen millimeters of mercury pressure, was obtained as a by-product in the condensation of one mole of cyclohexanone and one mole of nitromethane in the presence of 1.5 moles of sodium hydroxide. Electrolytic reduction, employing the apparatus and conditions of Example 5, was productive of the 1-(aminomethyl)-cyclohexane, boiling at 61–63 degrees centigrade under twelve millimeters of mercury pressure. The hydrochloride salt of 1-(aminomethyl)-cyclohexane had a melting point of 250–251 degrees centigrade.

Example 9

Following the procedure of Example 1, cyclooctanone (boiling point 80–83 degrees centigrade at fifteen millimeters pressure) is condensed with nitromethane in the presence of sodium hydroxide in methanol to yield 1-(nitromethyl)-cyclooctanol, from which the 1-(aminomethyl)-cyclooctanol (boiling point 135 degrees centigrade at fifteen millimeters pressure) is obtained upon electrolytic reduction. The 1-(aminomethyl)-cyclooctanol is then reacted with nitrous acid, as described in Example 1C, the cyclononanone thus-obtained boiling at 94–95 degrees centigrade under thirteen millimeters of mercury pressure.

Thus, by employing the novel process of the present invention, the cycloalkanones such as cycloheptanone, cyclooctanone and cyclononanone, respectively, and the like can be prepared from those cycloalkanones having one less methylene group in the ring, namely, cyclohexanone, cycloheptanone, and cyclooctanone, respectively, and others. With the aid of an approximately equimolar proportion of an aqueous alkali metal hydroxide the starting cycloalkanone or substituted cycloalkanone can be condensed under non-anhydrous conditions with a nitroalkane to the corresponding nitro-alcohol in up to 72 percent yield. Such 1-(nitroalkyl)-cycloalkanol can then be electrolytically reduced with hydrogen in yields up to ninety percent and higher to form the amino-alcohol, from which the enlarged cycloalkanone can be formed by the nitrous acid reaction with the amino-alcohol in an overall yield of from fifty to sixty percent, based upon the intermediate nitro-alcohol.

Various modifications may be made in the process and products of the present invention without departing from the spirit or scope thereof and it is to be understood that I limit myself only as defined in the appended claims.

I claim:

1. In a process for the preparation of cycloalkanones, the steps comprising: reacting a cycloalkanone having the formula

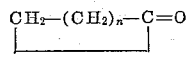

wherein $n$ is an integer selected from the group consisting of 4, 5 and 6, with a nitroalkane to form a 1-(nitroalkyl)-cycloalkanol; electrolytically reducing the said 1-(nitroalkyl)-cycloalkanol to form a 1-(aminoalkyl)-cycloalkanol; and, converting by contacting with nitrous acid the said 1-(aminoalkyl)-cycloalkanol to a cycloalkanone having the formula

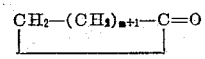

wherein $n$ is the integer of the cycloalkanone of the said first step.

2. In a process for the preparation of cycloalkanones, the steps comprising: reacting a cycloalkanone having the formula

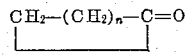

wherein $n$ is an integer selected from the group consisting of 4, 5 and 6, with a nitroalkane in the presence of an aqueous alkali metal hydroxide condensing agent to form a 1-(nitroalkyl)-cycloalkanol; electrolytically reducing the said 1-(nitroalkyl)-cycloalkanol to form a 1-(aminoalkyl)-cycloalkanol; and, converting the said 1-(aminoalkyl)-cycloalkanol with nitrous acid to a cycloalkanone having the formula

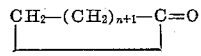

wherein $n$ is the integer of the cycloalkanone of the said first step.

3. In a process for the preparation of cycloheptanone, the steps comprising: reacting cyclohexanone with nitromethane in the presence of an aqueous sodium hydroxide condensing agent to form 1-(nitromethyl)-cyclohexanol; electrolytically reducing the said 1-(nitromethyl)-cyclohexanol to form a 1-(aminomethyl)-cyclohexanol; and, converting said 1-(aminomethyl)-cyclohexanol with nitrous acid to cycloheptanone.

4. The process for the preparation of cycloalkanones; which comprises: contacting cycloheptanone with nitromethane in the presence of an aqueous sodium hydroxide condensing agent to form 1-(nitromethyl)-cycloheptanol; electrolytically reducing said 1-(nitromethyl)-cycloheptanol to form 1-(aminomethyl)-cycloheptanol; and, converting said 1-(aminomethyl)-cycloheptanol with nitrous acid to cyclooctanone.

5. A process for the preparation of cyclononanone; which comprises: reacting cyclooctanone with nitromethane in the presence of an aqueous sodium hydroxide condensing agent to form 1-(nitromethyl)-cyclooctanol; electrolytically reducing the said 1-(nitromethyl)-cyclooctanol to form 1-(aminomethyl)-cyclooctanol; and, converting the said 1-(aminomethyl)-cyclooctanol with nitrous acid to form cyclononanone.

References Cited in the file of this patent

UNITED STATES PATENTS

| | | |
|---|---|---|
| 1,713,475 | Matsumiya et al. | May 14, 1929 |
| 2,135,444 | Vanderbilt | Nov. 1, 1938 |

OTHER REFERENCES

Fraser et al.: "J. Chem. Soc." (London), 1934, pp. 604 to 610.

Ruzicka et al.: "Hel. Chim. Acta," vol. 26 (1943), pp. 1631 to 1633.

Shoppee et al.: "Hel. Chim. Acta," vol. 26 (1943), pp. 185 to 189.